(12) United States Patent
Lin et al.

(10) Patent No.: US 9,791,946 B2
(45) Date of Patent: Oct. 17, 2017

(54) POWER SAVING CIRCUIT AND ELECTRONIC DEVICE HAVING THE SAME

(71) Applicant: Cheng Uei Precision Industry Co., Ltd., New Taipei (TW)

(72) Inventors: Sheng-Yuan Lin, New Taipei (TW); Duo-Chi Fan, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 299 days.

(21) Appl. No.: 14/684,309

(22) Filed: Apr. 10, 2015

(65) Prior Publication Data

US 2016/0299552 A1    Oct. 13, 2016

(51) Int. Cl.
| | |
|---|---|
| *G06F 3/033* | (2013.01) |
| *G06F 3/0354* | (2013.01) |
| *G06F 1/32* | (2006.01) |
| *G06F 3/038* | (2013.01) |

(52) U.S. Cl.
CPC ........ *G06F 3/03545* (2013.01); *G06F 1/3259* (2013.01); *G06F 3/0383* (2013.01); *Y02B 60/1253* (2013.01)

(58) Field of Classification Search
CPC ............. G06F 3/03545; G06F 3/03546; G06F 3/0383; G06F 1/3259
See application file for complete search history.

(56) References Cited

U.S. PATENT DOCUMENTS

| | | | |
|---|---|---|---|
| 9,542,014 B1* | 1/2017 | Sundara-Rajan ... | G06F 3/03545 |
| 2007/0013658 A1* | 1/2007 | Chien .................... | G06F 1/3203 345/158 |
| 2008/0231613 A1* | 9/2008 | Tsai ...................... | G06F 3/03545 345/179 |
| 2011/0090146 A1* | 4/2011 | Katsurahira ........ | G06F 3/03545 345/156 |
| 2012/0256830 A1* | 10/2012 | Oda ..................... | G06F 3/03545 345/157 |
| 2014/0028577 A1* | 1/2014 | Krah ..................... | G06F 3/0416 345/173 |
| 2014/0160088 A1* | 6/2014 | Mercea ................. | G06F 1/3259 345/179 |
| 2014/0333589 A1* | 11/2014 | Wang ................... | G06F 3/03545 345/179 |

(Continued)

*Primary Examiner* — Amare Mengistu
*Assistant Examiner* — Crystal A Mathews
(74) *Attorney, Agent, or Firm* — Cheng-Ju Chiang

(57) ABSTRACT

A power saving circuit includes a variable resistor, a switch and a processing module. A power supply unit is connected between the switch and the variable resistor. The processing module is connected between the switch and the variable resistor. The switch connects with the variable resistor. The switch is capable of conducting the power supply unit and the processing module when the variable resistor is be pressed. The processing module is capable of transmitting a working signal to the switch for making the switch continuing conducting the power supply unit and the processing module when the variable resistor is unpressurized after the power is transmitted to the processing module. The processing module is capable of detecting the condition of the voltage of the variable resistor to change the working signal. The switch is capable of breaking the power supply of the processing module if the working signal is off state.

6 Claims, 5 Drawing Sheets

(56) References Cited

U.S. PATENT DOCUMENTS

| | | | | |
|---|---|---|---|---|
| 2015/0015548 A1* | 1/2015 | Cheng | .................. | G06F 3/03545 |
| | | | | 345/179 |
| 2015/0070293 A1* | 3/2015 | Yu | ........................... | G06F 3/044 |
| | | | | 345/174 |
| 2015/0070330 A1* | 3/2015 | Stern | ................... | G06F 3/03545 |
| | | | | 345/179 |
| 2015/0145836 A1* | 5/2015 | Katsurahira | ........ | G06F 3/03545 |
| | | | | 345/179 |
| 2015/0363012 A1* | 12/2015 | Sundara-Rajan | ....... | G06F 3/038 |
| | | | | 345/179 |
| 2016/0048224 A1* | 2/2016 | Brunet | ................ | G06F 3/03545 |
| | | | | 345/174 |
| 2016/0209957 A1* | 7/2016 | Jung | ....................... | G06F 3/044 |
| 2016/0266663 A1* | 9/2016 | Holsen | ................ | G06F 3/03545 |

\* cited by examiner

POWER SAVING CIRCUIT AND ELECTRONIC DEVICE HAVING THE SAME

BACKGROUND OF THE INVENTION

1. Field of the Invention

The present invention relates to a power saving circuit, and more particularly to a power saving circuit and an electronic device having the same which is capable of saving the power consumption of the electronic device through a pressure sensing function.

2. The Related Art

A conventional electronic device is still consume a little power in the deep sleep state, because the power supply is supplied to certain parts of the electronic device in order to rapidly awaken the electronic device when reusing the electronic device. The power consumption is still a serious problem to users of the electronic device.

Furthermore, a conventional stylus, capable of detecting pressure on a tip thereof, has a button for turning on the power supply from sleep state. The stylus is a low-power consumption product. If the power consumption of the stylus in the sleep state is removed, the use of time and standby time of the stylus will be increased.

Therefore, there is a need for a power saving circuit and electronic device having the same which can efficiently solve the problem of the power consumption of the electronic device.

SUMMARY OF THE INVENTION

Accordingly, an object of the present invention is to provide a power saving circuit. The power saving circuit is interposed between a power supply unit and a device circuit. The power saving circuit includes a variable resistor, a switch and a processing module. The power supply unit is connected between the switch and the variable resistor. The processing module is connected between the switch and the variable resistor. The switch connects with the variable resistor. The switch is capable of conducting the power supply unit and the processing module when the variable resistor is pressed. The processing module is capable of transmitting a working signal to the switch for making the switch continuing conducting the power supply unit and the processing module when the variable resistor is unpressurized after the power is transmitted to the processing module, the processing module is capable of detecting the condition of the voltage of the variable resistor to change the working signal. The switch is capable of breaking the power supply of the processing module if the working signal is off state.

As described above, the power saving circuit can efficiently remove the power consumption of an electronic device when the electronic device is in sleep state, therefore, the standby time of the electronic device is increased.

BRIEF DESCRIPTION OF THE DRAWINGS

The present invention will be apparent to those skilled in the art by reading the following description thereof, with reference to the attached drawings, in which.

DETAILED DESCRIPTION OF THE EMBODIMENT

Figure 1:
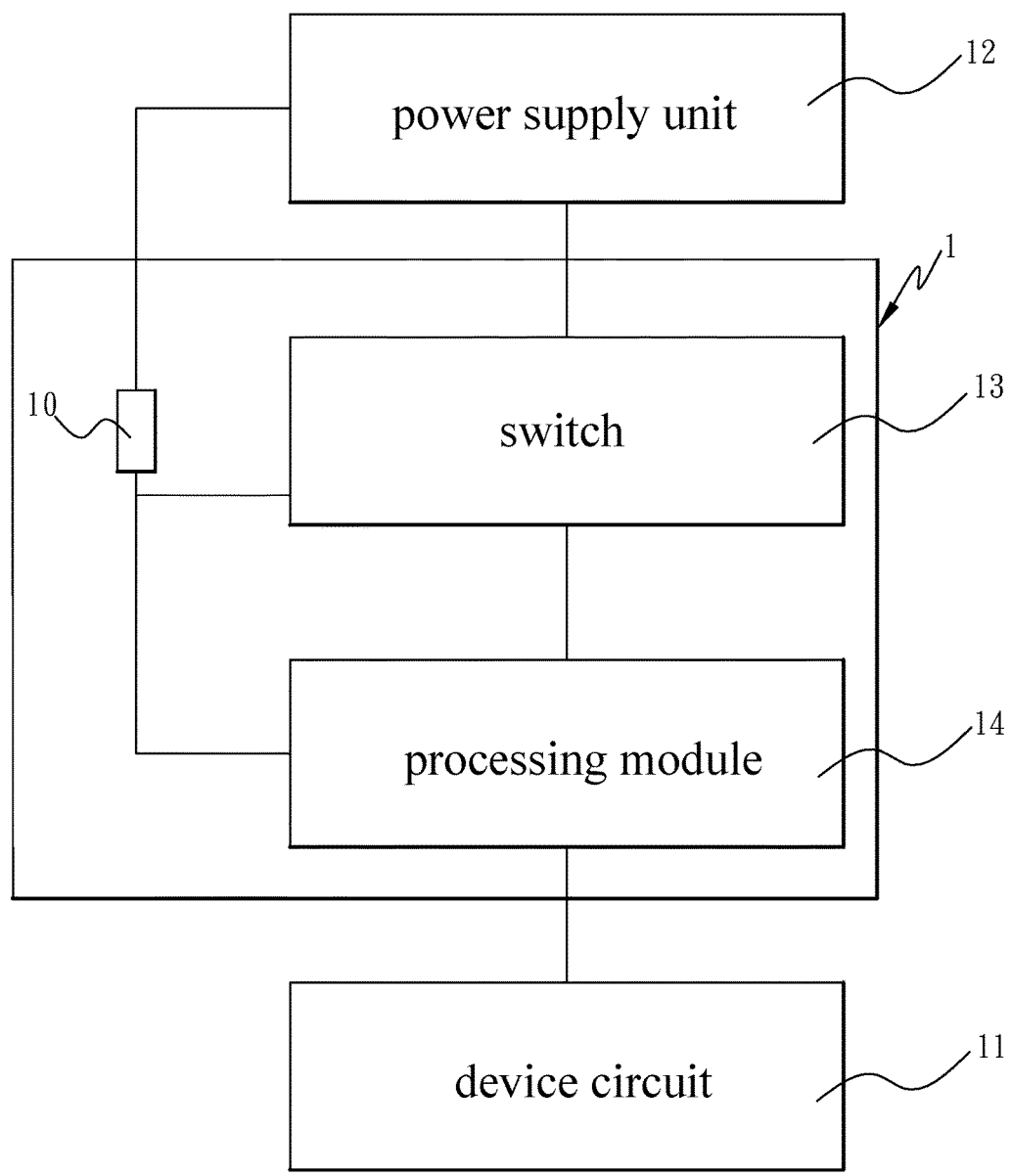
FIG. 1 is a block diagram of a power saving circuit in accordance with an embodiment of the present invention.

Please refer to FIG. 1, a power saving circuit 1 according to an embodiment of the present invention is interposed between a power supply unit 12 and a device circuit 11. The power supply unit 12 is capable of saving the power consumption of the device circuit 11 through a pressure sensing function.

The power saving circuit 1 includes a variable resistor 10, a switch 13 and a processing module 14. The power supply unit 12 is connected between the switch 13 and the variable resistor 10. The processing module 14 is connected between the switch 13, the variable resistor 10 and the device circuit 11. The switch 13 is connected with the variable resistor 10.

In this embodiment of the power saving circuit 1, the switch 13 is capable of conducting the power supply unit 12 and the processing module 14 when the variable resistor 10 is pressed. The processing module 14 is capable of transmitting a working signal to the switch 13 for making the switch 13 continuing conducting the power supply unit 12 and the processing module 14 when the variable resistor 10 is unpressurized after the power is transmitted to the processing module 14. The processing module 14 is capable of detecting the condition of the voltage of the variable resistor 10 to change the working signal. The switch 13 is capable of breaking the power supply of the processing module 14 if the working signal is off state.

In this embodiment of the power saving circuit 1, the variable resistor 10 is a pressure sensor.

Figure 2:
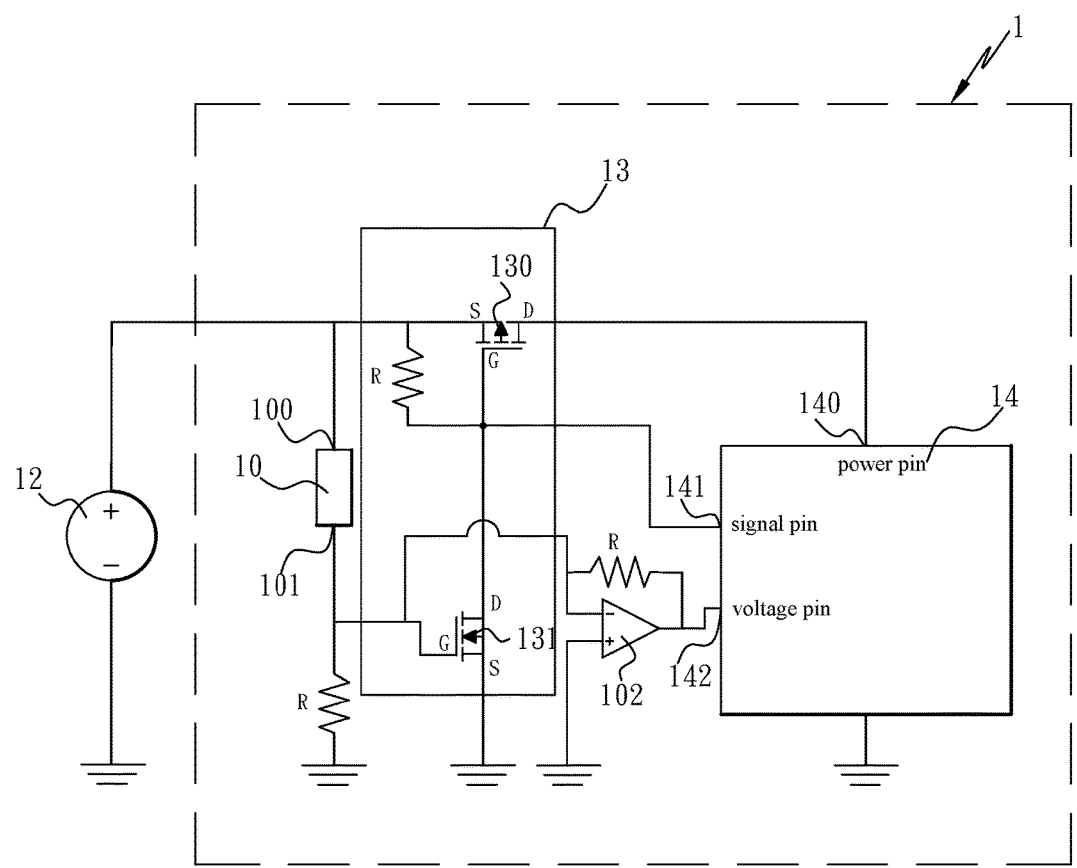
FIG. 2 is a schematic diagram of a power saving circuit of FIG. 1 in accordance with an embodiment of the present invention.

Please refer to FIG. 2, the variable resistor 10 includes a first end 100 and a second end 101, the switch 13 includes a PMOS transistor 130 and a NMOS transistor 131. The processing module 14 includes a power pin 140, a signal pin 141 and a voltage pin 142.

The positive of the power supply unit 12 connects to the source S of the PMOS transistor 130 and the first end 100 of the variable resistor 10. The second end 101 of the variable resistor 10 connects to the gate G of the NMOS transistor 131. The second end 101 of the variable resistor 10 and the gate G of the NMOS transistor 131 are connects to ground potential via a resistor and connects to the voltage pin 142. The source S of the NMOS transistor 131 connects to ground potential. The drain D of the NMOS transistor 131 connects to the gate G of the PMOS transistor 130. The drain D of the PMOS transistor 130 connects to the power pin 140. The positive of the power supply unit 12 and the source S of the PMOS transistor 130 are connected between the gate G of the PMOS transistor 130, the drain D of the NMOS transistor 131 and the signal pin 141 via a resistor.

The second end 101 of the variable resistor 10 and the gate G of the NMOS transistor 131 connects to the voltage pin 142 via an inverting amplifier 102 for amplifying the voltage of the variable resistor 10 and controlling current flow.

When the variable resistor 10 is pressed, the resistance of the variable resistor 10 is smaller because of the pressure, then the current flows to the gate G of the NMOS transistor 131 through the variable resistor 10 that makes the source S of the NMOS transistor 131 and the drain D of the NMOS transistor 131 being conducted. Due to the source S of the NMOS transistor 131 connects to the ground potential, the gate G of the PMOS transistor 130 becomes "low level" that makes the source S of the PMOS transistor 130 and the drain D of the PMOS transistor 130 are conducted, whereupon, the current flows to the power pin 140 through the PMOS transistor 130.

If the processing module 14 receives the current flow, the voltage of the variable resistor 10 would be sensed by the processing module 14. The processing module 14 controls the signal pin 141 become "low level" to make the gate G of the PMOS transistor 130 become low level in order to maintain the source S of the PMOS transistor 130 and the drain D of the PMOS transistor 130 being conducted (at this time, whether the variable resistor 10 is pressed or not, the processing module 14 will continue receiving the power supply).

If the device circuit 11 needs to be turned off, the user can control the processing module 14 to make the signal pin 141 at "high level", whereupon the gate G of the PMOS transistor 130 becomes "high level" and then the source S of the PMOS transistor 130 and the drain D of the PMOS transistor 130 are nonconducted.

Figure 3:
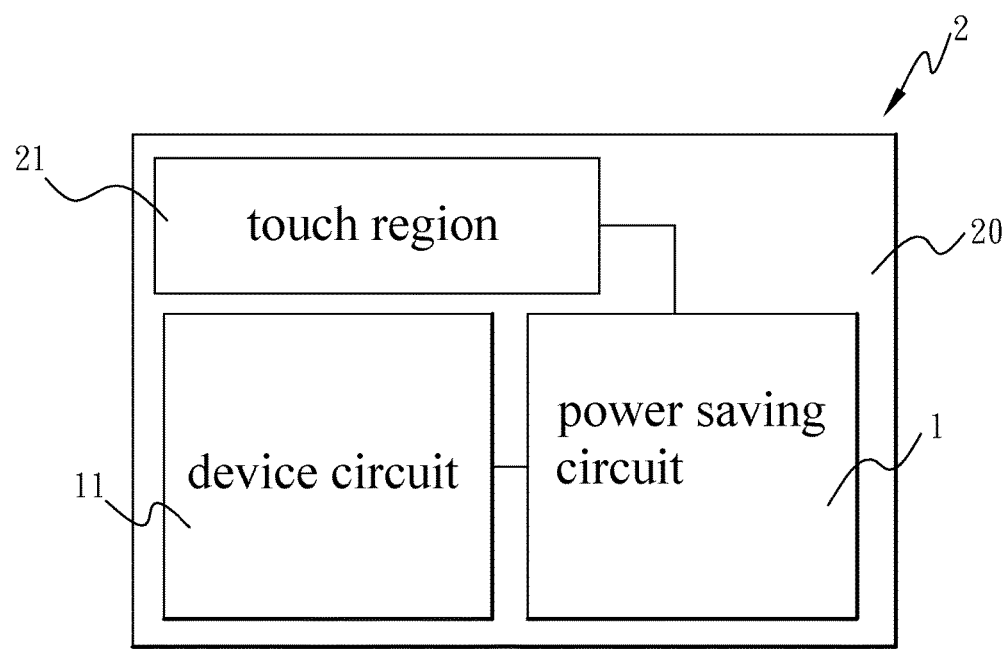
FIG. 3 is a block diagram of an electronic device having the power saving circuit in accordance with an embodiment of the present invention.

Please refer to FIG. 3, the power saving circuit 1 can be applied to an electronic device 2. The electronic device 2 has a housing 20 defining a touch region 21. The power saving circuit 1 and the device circuit 11 are disposed in the housing 20. The variable resistor 10 is configured to sense touch from the touch region 21. The touch region 21 of the housing 20 is used for contacting an object. The device circuit 11 controls the electronic device 2 according to the voltage of the variable resistor 10.

Figure 4:
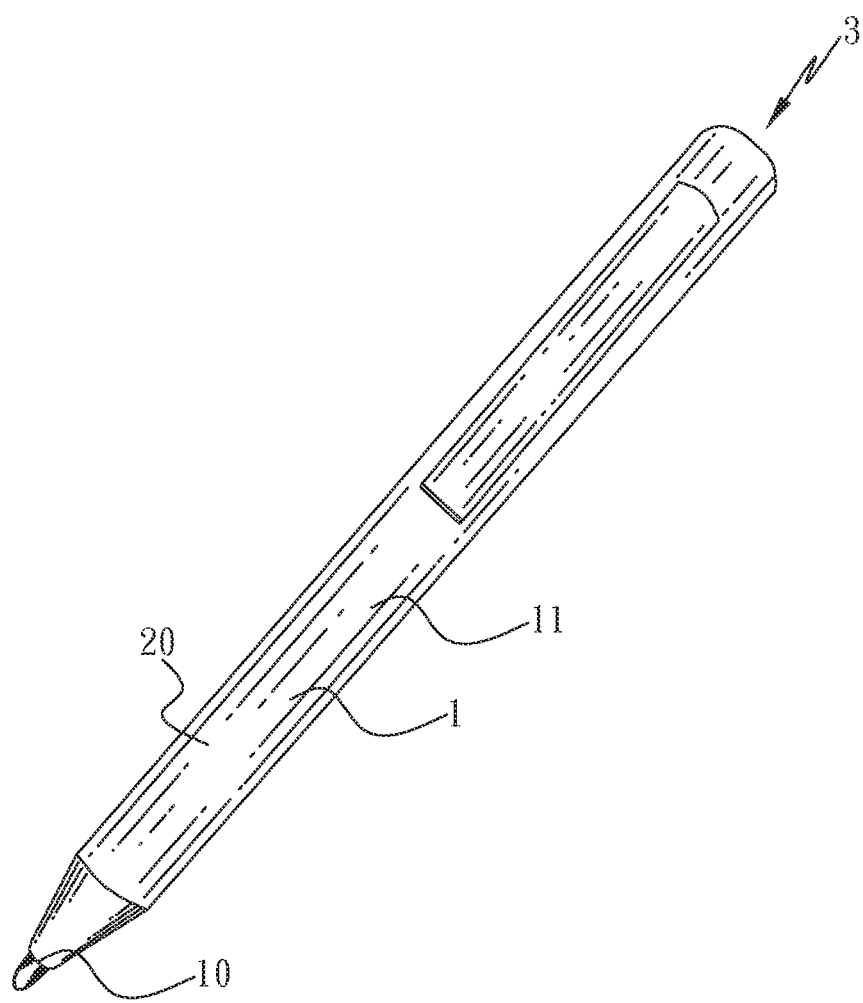
FIG. 4 is a schematic diagram of a stylus in accordance with another embodiment of the present invention.

Please refer to FIG. 4, in a further embodiment, the electronic device 2 is a stylus 3. The housing 20 is pen-shape, the variable resistor 10 is disposed in one end of the housing 20. A wireless module 30 connects to the device circuit 11 for communicating with other devices.

Figure 5:
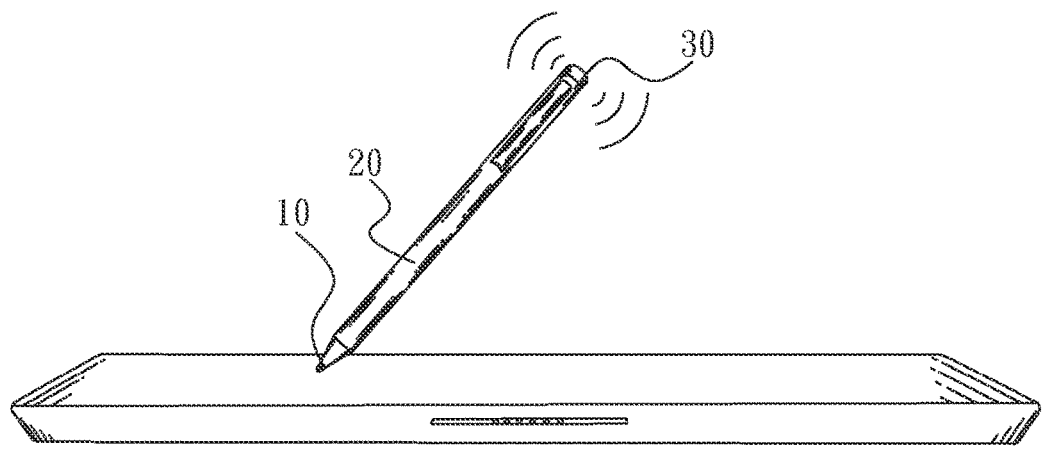
FIG. 5 is another schematic diagram of the stylus of FIG. 4.

Please refer to FIG. 5, the variable resistor 10 is used to sense the stylus 3 stroke and is used as a button which is pressed when the one end of the housing 20 touches the object.

As described above, the power saving circuit 1 includes the following advantages: first, the power saving circuit 1 can efficiently remove the power consumption of the electronic device 2 when the electronic device 2 is in sleep state, therefore, the standby time of the electronic device 2 is increased.

The foregoing description of the present invention has been presented for the purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A power saving circuit interposed between a power supply unit and a device circuit, comprising:
   a variable resistor, a switch and a processing module, the power supply unit connected between the switch and the variable resistor, the processing module connected between the switch and the variable resistor, the switch connected with the variable resistor, the switch capable of conducting the power supply unit and the processing module when the variable resistor is pressed, the processing module capable of transmitting a working signal to the switch for making the switch continuing conducting the power supply unit and the processing module when the variable resistor is unpressurized after the power is transmitted to the processing module, the processing module capable of detecting the condition of the voltage of the variable resistor to change the working signal, the switch capable of breaking the power supply of the processing module if the working signal is off state;
   wherein the variable resistor comprises a first end and a second end, the switch comprises a p-channel metal oxide semiconductor field effect transistor (p-channel MOSFET, PMOS transistor) and a n-channel metal oxide semiconductor field effect transistor (n-channel MOSFET, NMOS transistor), the processing module comprises a power pin, a signal pin and a voltage pin, the positive of the power supply unit is connected to the source of the PMOS transistor and the first end of the variable resistor, the second end of the variable resistor is connected to the gate of the NMOS transistor, the second end of the variable resistor and the gate of the NMOS transistor are connected to ground potential via a resistor and connected to the voltage pin, the source of the NMOS transistor is connected to ground potential, the drain of the NMOS transistor is connected to the gate of the PMOS transistor, the drain of the PMOS transistor is connected to the power pin, the positive of the power supply unit and the source of the PMOS transistor are connected between the gate of the PMOS transistor, the drain of the NMOS transistor and the signal pin via a resistor.

2. The power saving circuit according to claim 1, wherein the variable resistor is a pressure sensor.

3. The power saving circuit according to claim 1, wherein the second end of the variable resistor and the gate of the NMOS transistor is connected to the voltage pin via an inverting amplifier.

4. An electronic device, comprising:
   a housing defining a touch region;
   a power saving circuit according to claim 1, disposed in the housing; and
   a device circuit disposed in the housing, which receives power supply from the power saving circuit;
   wherein the variable resistor is configured to sense touch from the touch region, the device circuit controls the electronic device according to the voltage of the variable resistor.

5. The electronic device according to claim 4, further comprising a wireless module connected to the device circuit.

6. The electronic device according to claim 4, wherein the electronic device is a stylus, the housing is pen-shape, the variable resistor connects to one end of the housing.

* * * * *